United States Patent
Watanabe

[11] Patent Number: 5,232,074
[45] Date of Patent: Aug. 3, 1993

[54] TEMPERATURE SENSITIVE FLUID COUPLING

[75] Inventor: Naoyuki Watanabe, Mishima, Japan

[73] Assignee: Usui Kokusai Sangyo Kaisha Ltd., Japan

[21] Appl. No.: 788,030

[22] Filed: Nov. 5, 1991

[30] Foreign Application Priority Data

Nov. 6, 1990 [JP] Japan .................................. 2-300154

[51] Int. Cl.$^5$ ..................... F16D 35/00; F16D 43/25
[52] U.S. Cl. ................................. 192/58 B; 192/82 T
[58] Field of Search ............................ 192/58 B, 82 T

[56] References Cited

U.S. PATENT DOCUMENTS

| | | | |
|---|---|---|---|
| 4,796,571 | 1/1989 | Ono et al. | 192/58 B X |
| 4,846,331 | 7/1989 | Ono | 192/58 B |
| 4,930,457 | 6/1990 | Tamai | 192/82 T X |
| 5,060,774 | 10/1991 | Takikawa et al. | 192/82 T X |
| 5,125,491 | 6/1992 | Takikawa et al. | 192/58 B |
| 5,139,125 | 8/1992 | Takikawa et al. | 192/58 B |

Primary Examiner—Rodney H. Bonck
Attorney, Agent, or Firm—Anthony J. Casella; Gerald E. Hespos

[57] ABSTRACT

A fan coupling device controls the transfer of torque from a rotating shaft to a closed housing having an oil basin chamber and a torque transfer chamber by varying the effective contact area of oil in a torque transfer gap defined between a driving disc secured to the rotating shaft and the inner wall surface of the closed housing. To incorporate a sub pumping function, a sub dam member is attached to the inner circumferential surface of the closed housing, a sub circulatory passage is formed which leads from around the sub dam member inside the torque transfer chamber to the oil basin chamber, and a temperature-sensitive valve element is provided inside the oil basin chamber to open and close the outlet port of the sub circulatory passage in accordance with the internal temperature of the closed housing.

7 Claims, 3 Drawing Sheets

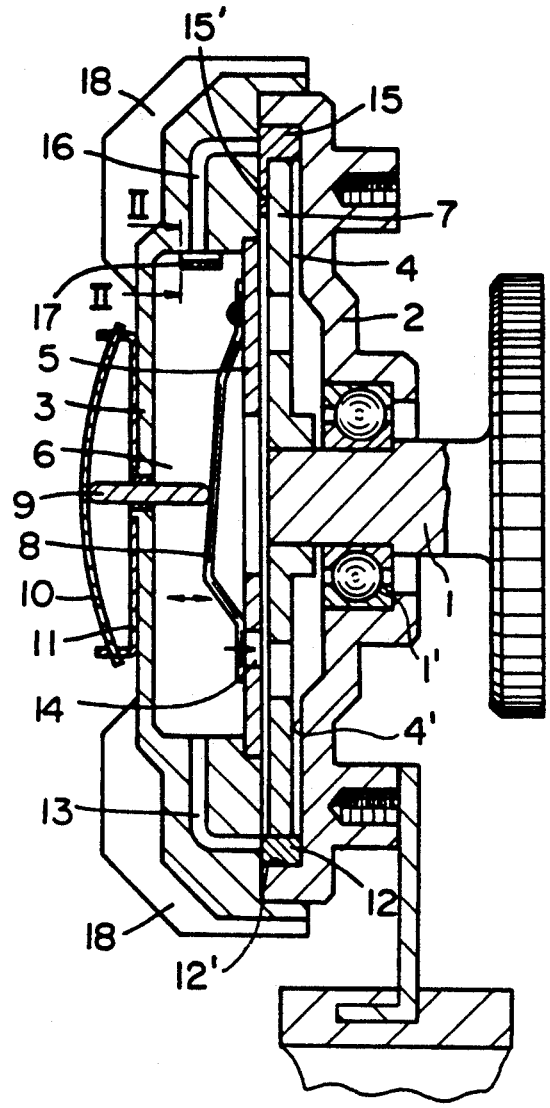
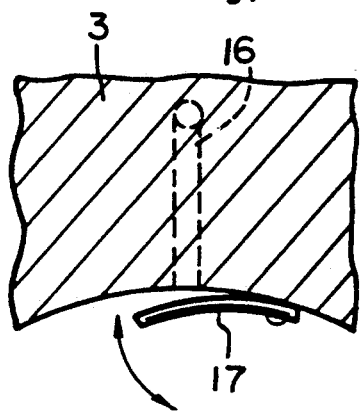

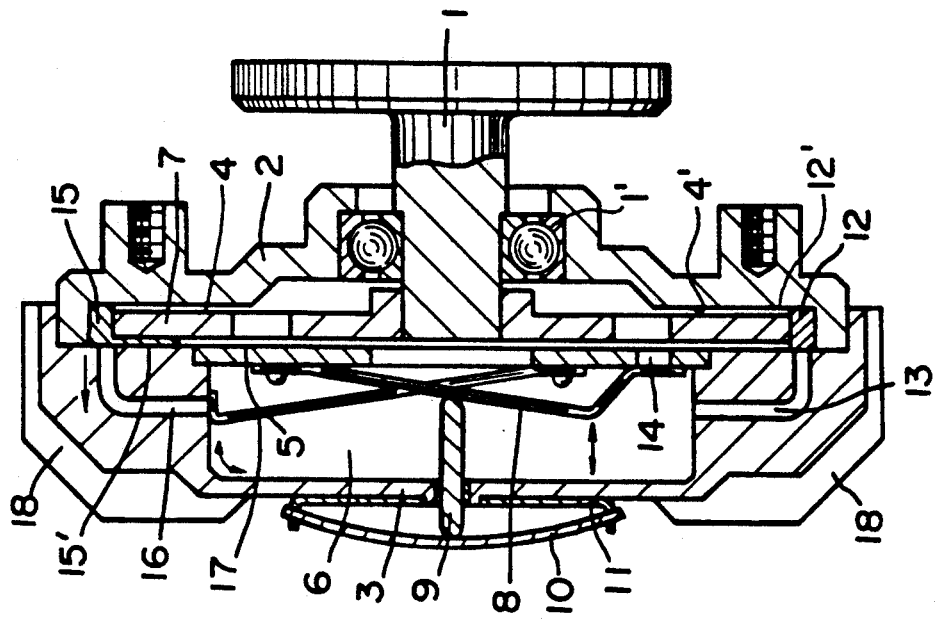
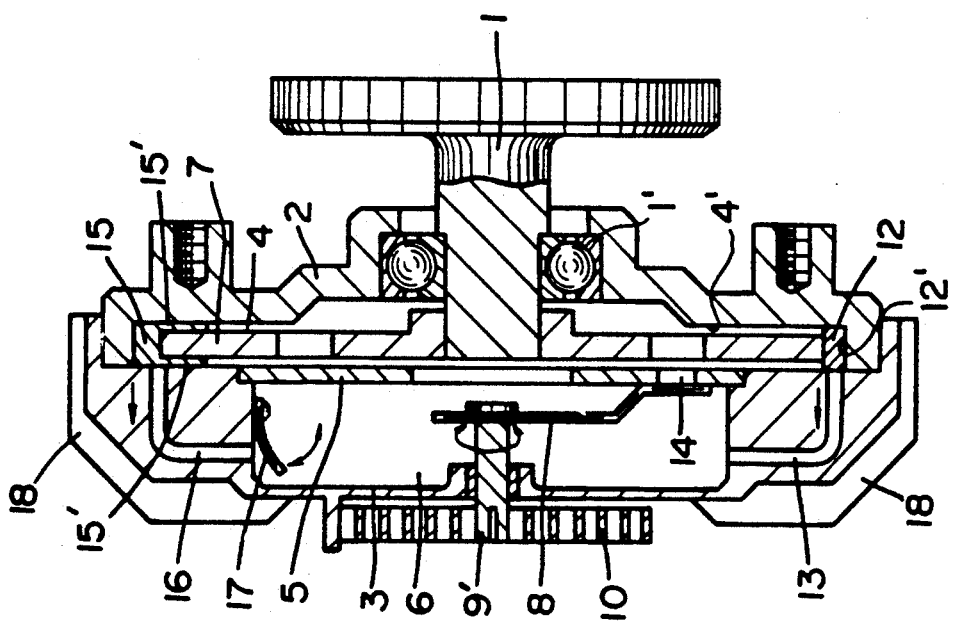

TEMPERATURE SENSITIVE FLUID COUPLING

BACKGROUND OF THE INVENTION

1. Field of the Invention:

This invention relates to a fan coupling device which controls the rotation of a fan for cooling a car engine in accordance with the external/ambient temperature of the device such that the engine is cooled by the controlled flow of cooling air of the fan.

2. Description of the Prior Art:

A conventional fan coupling device of the above type comprises a closed housing whose inside is divided into two chambers: a torque transfer chamber and an oil basin chamber. A so-called pumping mechanism is formed by a dam member which is attached to the inner circumferential surface of the torque transfer chamber where oil is accumulated during rotating and a circulatory passage which leads from around the dam member inside the torque transfer chamber to the oil basin chamber. A flow adjusting hole leading from the oil basin chamber to the torque transfer chamber is opened and closed by a valve member provided inside the oil basin chamber which is actuated by a temperature sensing member (provided in front of the closed housing) for sensing the external or or ambient temperature of the closed housing. Therefore, the effective contact area of oil in a torque transfer gap in which a driving disc is disposed is regulated to control the transfer of turning torque to the closed housing (on the driven side).

In the foregoing type of fan coupling device, when the engine comes to a stop with the flow adjusting hole opened due to a high external/ambient temperature, or when the flow adjusting hole is sunk in the oil inside the oil basin chamber during engine stoppage, the amount of oil inside the torque transfer chamber increases due to the natural flow of oil through the flow adjusting hole to the torque transfer chamber.

Accordingly, the conventional pumping mechanism causes "accompanying rotation" on the fan side immediately after engine starting, as illustrated by the characteristic curve B of FIG. 7. This imposes a bad influence on the engine or over-cools the engine, especially in the winter or cold season, to hinder warming up and result in large fan noise.

SUMMARY OF THE INVENTION

It is an object of the present invention to provide a fan coupling device in which the oil remaining in a torque transfer chamber is caused to quickly flow into an oil basin chamber immediately after engine starting, thereby preventing accompanying rotation after engine starting, eliminating a fear of engine over-cooling even in the winter or cold season, promoting warming up, and reducing fan noise.

To accomplish the foregoing object, the present invention provides a fan coupling device which comprises a closed housing supported via a bearing by a rotating shaft having a driving disc secured to the distal end thereof which is composed of a cover and a casing having a cooling fan attached to the periphery thereof, a partition board for dividing the inside of the closed housing to define an oil basin chamber and a torque transfer chamber in which the driving disc is disposed, a dam member attached to the inner circumferential surface of the closed housing where oil is accumulated during rotating, a circulatory passage leading from around the dam member inside the torque transfer chamber to the oil basin chamber, a valve member provided inside the oil basin chamber for opening and closing a flow adjusting hole leading to the torque transfer chamber, and a temperature sensing member provided in front of the cover which undergoes deformation in accordance with the external temperature of the closed housing to actuate the valve member, wherein the transfer of torque from the rotating shaft on the driving side to the closed housing on the driven side is controlled as the effective contact area of oil in a torque transfer gap defined between the driving disc and the inner wall surface of the closed housing varies; and is characterized by a sub pumping mechanism formed by a sub dam member attached to the inner circumferential surface of the closed housing, a sub circulatory passage leading from around the sub dam member inside the torque transfer chamber to the oil basin chamber, and a temperature-sensitive valve element provided inside the oil basin chamber for opening and closing the outlet port of the sub circulatory passage in accordance with the internal temperature of the closed housing.

The temperature-sensitive valve element is secured at its one end to the inner wall surface of the oil basin chamber, and the outlet port is opened and closed by the other end of the temperature-sensitive valve element which shifts radially or circumferentially. Preferably, the sub dam member is substantially L-shaped or U-shaped in section whose one leg segment is inserted in the torque transfer gap.

As will be appreciated, the present invention incorporates the sub pumping mechanism in which the outlet port of the sub circulatory passage is opened and closed by means of the temperature-sensitive valve element in accordance with the internal temperature of the closed housing, such as oil temperature, cover temperature, or inside air temperature. Therefore, the outlet port of the sub circulatory passage is held open while the oil temperature is low. Immediately after engine starting, the oil remaining inside the torque transfer chamber is caused to quickly flow into the oil basin chamber by means of the sub pumping function based on the sub dam member as well as the normal pumping function based on the conventional dam member. Accordingly, "accompanying rotation" on the fan side immediately after engine starting is prevented, a fear of engine overcooling in the winter or cold season is eliminated, warming up is promoted, and fan noise is reduced. The foregoing effects can be enhanced by shaping the sub dam member as illustrated.

BRIEF DESCRIPTION OF THE DRAWINGS

FIG. 1 is a vertical sectional view showing an embodiment of a fan coupling device according to the present invention;

FIG. 2 is a fragmentary sectional view taken along the line II—II of FIG. 1;

FIGS. 3 and 4 are vertical sectional views showing other embodiments of the fan coupling device according to the present invention;

DETAILED DESCRIPTION OF THE PREFERRED EMBODIMENTS

Figure 5:
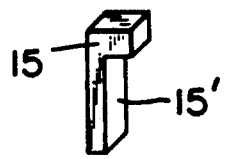
FIGS. 5 and 6 are perspective views showing embodiments of a sub dam member according to the present invention which forms part of a second (sub) pumping mechanism.
Figure 6:
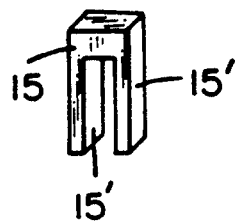

In FIGS. 1 through 6, a rotating shaft 1 (on the driving side) has a driving disc 7 secured to the distal end thereof. This rotating shaft 1 supports a closed housing by means of a bearing 1', this closed housing comprising a cover 3 and a casing 2 having a cooling fan (not shown) attached to the periphery thereof. A disc-shaped partition board 5 (having a flow adjusting hole 14 formed therein) divides the inside of the closed housing into two chambers: an oil basin chamber 6 and a torque transfer chamber 4 (in which the driving disc 7 is disposed). The driving disc 7 disposed inside the torque transfer chamber 4 is spaced apart from the inner wall surface 4' of the torque transfer chamber 4 to define a narrow gap (for torque transfer) between them.

8 designates a lever-shaped valve member made of resilient material which is provided inside the oil basin chamber 6. One end of this valve member 8 is riveted to the partition board 5 (see FIGS. 1 and 4) or secured to a support shaft 9' of a spiral-shaped temperature-sensing member 10 made of bimetal provided in front of the cover 3 (see FIG. 3). When the ambient (external) temperature of the closed housing changes, the valve member 8 is deformed or shifted axially (see FIGS. 1 and 4) or circumferentially (see FIG. 3) by means of a connecting rod 9 of the temperature sensing member 10 (see FIGS. 1 and 4) or by means of the foregoing support shaft 9' (see FIG. 3) so that the other end of the valve member 8 opens or closes the flow adjusting hole 14 leading to the torque transfer chamber 4 or a flow adjusting hole (not shown) formed in the cover 3. As illustrated, the plate-shaped temperature-sensing member 10 is supported at its both ends by fixtures 11 provided in front of the cover 3 and is held in contact with the connecting rod 9, whereas the spiral-shaped temperature-sensing member 10 is secured at its outer end to the cover 3.

A dam member 12 attached to the inner circumferential surface 12' of the closed housing serves to accumulate oil. The oil accumulated by the dam member 12 flows through a circulatory passage 13 leading from the torque transfer chamber 4 to the oil basin chamber 6, this being called a (normal) pumping function or mechanism. A sub dam member 15 is attached to the inner circumferential surface (along which the circumference of the driving disc 7 moves) of the closed housing where oil is accumulated due to the centrifugal force during rotating. The oil accumulated by the sub dam member 15 flows through a sub circulatory passage 16 (whose inlet port is opened at a point immediately before the sub dam member as viewed in the turning direction) leading from the torque transfer chamber 4 to the oil basin chamber 6, this being called a sub pumping function or mechanism.

Figure 7:
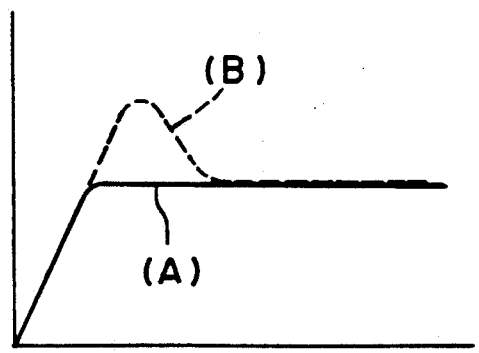
FIG. 7 is a diagram showing the characteristic curve of the present invention.

In the present invention, a temperature-sensitive valve element 17 made of bimetal, shape-memory alloy or shape-memory resin is provided close to the outlet port (on the side of the oil basin chamber 6) of the sub circulatory passage 16 to open and close the outlet port in accordance with the internal temperature of the closed housing. That is, when the oil temperature is low as during engine stoppage, the outlet port of the sub circulatory passage 16 is in the open state. After engine starting, the outlet port is progressively closed as the oil temperature increases, finally resulting in the normal pumping function alone. The sub dam member 15 is substantially L-shaped or U-shaped in section as having one or two leg segments 15'. This (one) leg segment 15' is inserted in the torque transfer gap such that the oil is effectively pumped through the sub circulatory passage 16 into the oil basin chamber 6 (by means of the sub pumping mechanism). The characteristic curve A of FIG. 7 relates to the present invention.

Therefore, when the oil temperature is low, the sub pumping mechanism based on the leg segment 15' (inserted in the torque transfer gap) of the sub dam member 15 with the temperature-sensitive valve element 17 keeping the sub circulatory passage 16 in the open state causes, in conjunction with the normal pumping function, the oil remaining in the torque transfer chamber 4 immediately after engine starting to quickly flow into the oil basin chamber 6. When the oil temperature increases due to the subsequent rotation, the outlet port is progressively closed, and finally, only the normal pumping mechanism performs control.

The temperature-sensitive valve element 17 is riveted at its one end to the cover 3 in the vicinity of the outlet port of the sub circulatory passage 16 such that its other end shifts radially to open and close the outlet port (see FIGS. 1 and 3), or is riveted at its one end to the partition board 5 such that its other end shifts axially to open and close the outlet port (see FIG. 4). 18 designates a radiating fin provided on the periphery of the cover 3. The solid-line arrows in the drawings indicate the shifting directions of the valve member 8 and the temperature-sensitive valve element 17 and the flow direction of the oil.

As described above, the fan coupling device according to the present invention includes the sub pumping mechanism composed of the sub dam member 15, sub circulatory passage 16 and temperature-sensitive valve element 17 (provided close to the outlet port); therefore, immediately after engine starting, the oil remaining in the torque transfer chamber 4 (due to natural flow during engine stoppage) is caused to quickly flow through both the circulatory passage 13 and the sub circulatory passage 16 into the oil basin chamber 6 by means of the normal pumping mechanism and the sub pumping mechanism, this preventing "accompanying rotation" on the fan side immediately after engine starting, eliminating a fear of engine over-cooling in the winter or cold season, promoting warming up, and reducing fan noise.

What is claimed is:

1. A fan coupling device comprising a closed housing supported via a bearing by a rotating shaft having a driving disc secured to an end thereof said closed housing comprising a cover and a casing, a partition board inside the closed housing to define an oil basin chamber and a torque transfer chamber in which the driving disc is disposed, a dam member attached to an inner circumferential surface of the closed housing where oil is accumulated during rotating, a circulatory passage leading from around the dam member inside the torque transfer chamber to the oil basin chamber, a valve member provided inside the oil basin chamber for opening and closing a flow adjusting hole leading to the torque transfer chamber, and a temperature sensing member on the cover which undergoes deformation in accordance with external temperature of the closed housing to actuate the valve member, wherein transfer of torque from the rotating shaft to the closed housing is controlled as contact area of oil in a torque transfer gap defined between the driving disc and an inner wall surface of the closed housing varies, a sub pumping mechanism formed by a sub dam member attached to the inner circumferential surface of the closed housing, a sub circulatory passage leading from around the sub dam member inside the torque transfer chamber to an outlet port in the oil basin chamber, and a temperature-sensitive valve element provided inside the oil basin chamber for opening and closing the outlet port of the sub circulatory passage in accordance with internal temperature of the closed housing.

2. A fan coupling device according to claim 1, wherein one end of the temperature-sensitive valve element is riveted to the inner wall surface of the oil basin chamber, and the other end opens and closes the outlet port as it shifts.

3. A fan coupling device according to claim 2, wherein the other end of the temperature-sensitive valve element shifts radially of the closed housing.

4. A fan coupling device according to claim 2, wherein the other end of the temperature-sensitive valve element shifts circumferentially of the closed housing.

5. A fan coupling device according to claim 1, wherein the sub dam member has a leg segment inserted in the torque transfer gap.

6. A fan coupling device according to claim 5, wherein the sub dam member has a substantially L-shaped cross section.

7. A fan coupling device according to claim 5, wherein the sub dam member has a substantially U-shaped cross section.

* * * * *